(12) United States Patent
Beck, II

(10) Patent No.: US 6,529,845 B1
(45) Date of Patent: Mar. 4, 2003

(54) COMPUTER FOR LIQUID LEVEL MEASUREMENT

(76) Inventor: Charles W. Beck, II, 500 Shady Oaks Trail, Burleson, TX (US) 76028

( * ) Notice: Subject to any disclaimer, the term of this patent is extended or adjusted under 35 U.S.C. 154(b) by 0 days.

(21) Appl. No.: 09/658,774

(22) Filed: Sep. 11, 2000

Related U.S. Application Data

(60) Provisional application No. 60/153,484, filed on Sep. 11, 1999.

(51) Int. Cl.$^7$ .............................. G01F 1/50; G01F 23/28; G01F 23/12
(52) U.S. Cl. .................. 702/100; 73/1.73; 123/339.19; 307/118; 347/43; 702/55
(58) Field of Search ............................ 702/12, 45, 50, 702/85, 55, 100, 114; 73/1.16, 1.73, 290 V, 340 C; 307/118; 347/43; 123/339.19

(56) References Cited

U.S. PATENT DOCUMENTS

| | | | | | |
|---|---|---|---|---|---|
| 3,995,279 A | * | 11/1976 | Wiesmuller et al. | ......... | 347/43 |
| 4,085,325 A | * | 4/1978 | Atallah et al. | ............. | 250/328 |
| 4,145,914 A | * | 3/1979 | Newman | ................. | 73/290 V |
| 4,437,340 A | * | 3/1984 | Csere et al. | .............. | 73/118.2 |
| 4,447,743 A | * | 5/1984 | Bean et al. | ................ | 307/118 |
| 4,729,236 A | * | 3/1988 | Samborsky | ................. | 73/1.25 |
| 4,819,483 A | * | 4/1989 | Emplit et al. | ............. | 73/304 C |
| 4,901,245 A | * | 2/1990 | Olson et al. | ................... | 702/54 |
| 5,023,806 A | * | 6/1991 | Patel | ........................... | 702/55 |
| 5,360,320 A | * | 11/1994 | Jameson et al. | ............... | 417/4 |
| 5,544,518 A | * | 8/1996 | Hart et al. | .................... | 73/1.73 |
| 6,021,754 A | * | 2/2000 | Kendrick | ............... | 123/339.19 |

FOREIGN PATENT DOCUMENTS

FR 2703776 A1 * 10/1994

* cited by examiner

Primary Examiner—John S. Hilten
Assistant Examiner—John Le
(74) Attorney, Agent, or Firm—Godwin Gruber P.C.; Arthur I. Navarro

(57) ABSTRACT

A computer (20) adapted to communicate with a measuring apparatus (12) for receiving liquid level measurements and delivering a calibrated fuel quantity output (24) to a readout instrument (14). The computer (20) has an input interface (34) with a first input (22A) for accepting a first liquid level measurement signal from said measuring apparatus (12). A first bias circuit (30A) provides an adjustable offset bias to minimize voltage errors due to input bias current received in the first liquid level measurement signal (26A). Computer (20) also has a calibrating circuit (36) for calibrating the first liquid level measurement signal to provide a calibrated fuel quantity output signal (24) that can be read by readout instrument (14) through output interface (42).

24 Claims, 5 Drawing Sheets

COMPUTER FOR LIQUID LEVEL MEASUREMENT

CROSS-REFERENCE TO RELATED APPLICATION

The application is related to Provisional Application Ser. No. 60/153,484 entitled "ANALOG COMPUTER FOR LIQUID LEVEL MEASUREMENT," by Charles W. Beck, filed Sep. 11, 1999, the entirety of which is incorporated herein by reference. This application claims priority on the aforementioned related provisional application.

TECHNICAL FIELD

The present invention relates generally to a system for liquid level measurement for use in airplanes, boats and automobiles, for example, and more particularly to a computer coupled to one or more Hall Effect and/or resistive float transducers for measuring liquid level in a fuel tank.

BACKGROUND OF THE INVENTION

Without limiting the scope of the invention, its background is described in connection to fuel tanks, more specifically aircraft fuel tanks.

Liquid level measurement in aircraft, automobiles, boats, and other vehicles has historically been measured by one or more floats connected to the arm of a variable resistor. The variable resistor, in turn, is coupled to a set of electrical leads which are brought through the wall of the fuel tank. A fuel gauge is connected to the leads into the vehicle's electrical bus. Typically, when the float is on the bottom of the tank, the resistance sensed is low and when the float is high, the resistance sensed is high, on the order of 30 ohms. This causes the needle on the fuel gauge to deflect as the float height varies, thus indicating the quantity of fuel in the tank. For odd shaped tanks such as a flat tank, the resistance floats may be connected in series to cover this longer sloped tank.

Linearization of the output is typically performed using a calibration curve for the readout gauge, with either the radial marking locations on the dial face of an analog gauge or an electrical linearization circuit in the case of a digital gauge. In either case, an electronic interface is needed in order to display liquid levels on the vehicle's instrumentation. The resistive float method is the fuel quantity gauging technique that is used on most, if not all, automobiles, all piston engine aircraft, and some turbine aircraft.

Another method of liquid level measurement has also been developed. An experimental method of liquid level measurement in an aircraft has been built and tested that uses a Hall Effect semiconductor device. The measurement method utilizing the Hall Effect device has been tested on a fuel system which uses a total of four float transducers, two in each tank, to measure the quantity of fuel. A linear output Hall Effect transducer is placed outside of the tank while a magnet is placed inside of a non-ferrous metal tank. The magnet is moved by the motion of a float arm as the liquid level changes in the tank. As the liquid level moves up or down, the magnet moves relative to the transducer, causing the change in transducer output voltage. This system allows liquid level measurement without any electrical connections inside the tank. This method does, however, require some electronic interface to allow the output to be used with a gauge. Additionally, there are linearity temperature effects that must be either suppressed or compensated for in the tank. A set of transducers using this technique has been built and flown with promising results.

Because both types of transducers, resistive float and Hall Effect, may potentially be available for use, a flexible electronic interface that can be used with both the resistive float and Hall Effect devices is needed. Accordingly, a means of calibrating the transducer outputs during liquid level measurement would provide numerous advantages.

SUMMARY OF THE INVENTION

The present invention provides a computer for liquid level measurement that may be interfaced with both resistive float devices and Hall Effect devices. The computer includes circuit components for calibration of electrical signals coming from one or more transducers. The electrical signals are delivered to the computer to be processed for use with readout instrumentation on-board the vehicle. The circuit components include a biasing circuit, a gain circuit, a summing circuit, and a calibration circuit.

Accordingly, disclosed in one embodiment is a computer for use in a liquid level measurement system. The computer is adapted to receive liquid level measurements from a measuring apparatus and to deliver a calibrated fuel quantity output signal to a readout instrument. The computer consists of an input interface with a first input which accepts a first liquid level measurement signal from the measuring apparatus. A first bias circuit provides an adjustable offset bias to minimize voltage errors due to input bias. Additionally, the first liquid level measurement signal is processed by a calibrating circuit which provides a calibrated fuel quantity output signal to the readout instrument. The readout instrument is connected to the computer through an output interface.

In another embodiment, a system for liquid level measurement is disclosed. The system includes a computer coupled to first and second transducers, each of which provides a corresponding first and second liquid level measurement signal to a corresponding first and second bias circuit within the computer which adjust the offset bias to minimize voltage errors due to input bias currents. Next, the first and second liquid level measurement signals are processed by first and second gain circuits, respectively, to adjust the signals so that they are balanced and matched with respect to each other. After each signal has been balanced and matched, the first and second liquid level measurement signals combine in a summing circuit so that a single summed output may be provided to a calibrating circuit. The calibrating circuit adjusts the summed output so that a calibrated fuel quantity output signal may be provided to a readout instrument through an output interface of the system.

A technical advantage of the present invention is that it can be used with both resistive float fuel transducers and Hall Effect fuel transducers.

Another technical advantage of the present invention is its ability to be located wherever it is convenient for installation on the aircraft instead of being an integral part of the transducer.

BRIEF DISCUSSION OF THE DRAWINGS

The advantages of the invention including specific embodiments will be understood by reference to the following detailed description taken in conjunction with the appended drawings in which.

References and terms in the detailed description correspond to like references and terms in the figures unless otherwise indicated.

DETAILED DESCRIPTION OF THE PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1A:
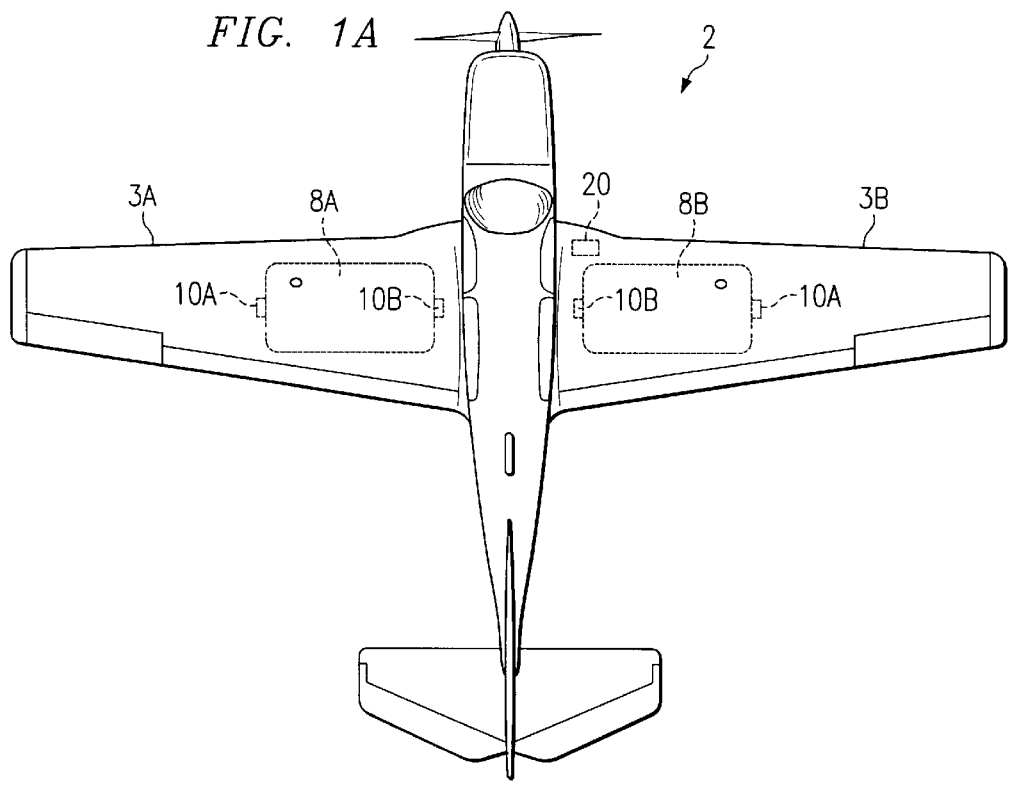
FIGS. 1A and 1B illustrate a system installation, according to one embodiment of the invention.
Figure 1B:
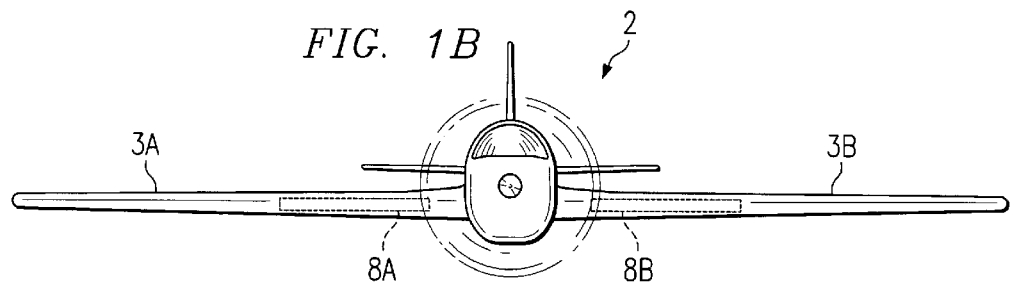

To fully appreciate the invention, reference is made to FIGS. 1A and 1B, wherein tanks 8A and 8B are shown in a typical location in wings 3A and 3B of an airplane 2. Tanks 8A and 8B store the fuel used to power the airplane 2. Accordingly, an accurate indication of the amount of fuel in tanks 8A and 8B is vital to the pilot. For example, if the airplane 2 is using fuel at a rate greater than the rate the pilot planned, the airplane 2 will run out of fuel before reaching the destination. An accurate fuel indicator would allow the pilot to recognize the problem and land for fuel instead of crashing. Computer 20 of the present invention will facilitate allowing the pilot to have an accurate indication of the liquid level in tanks 8A and 8B.

Figure 2:
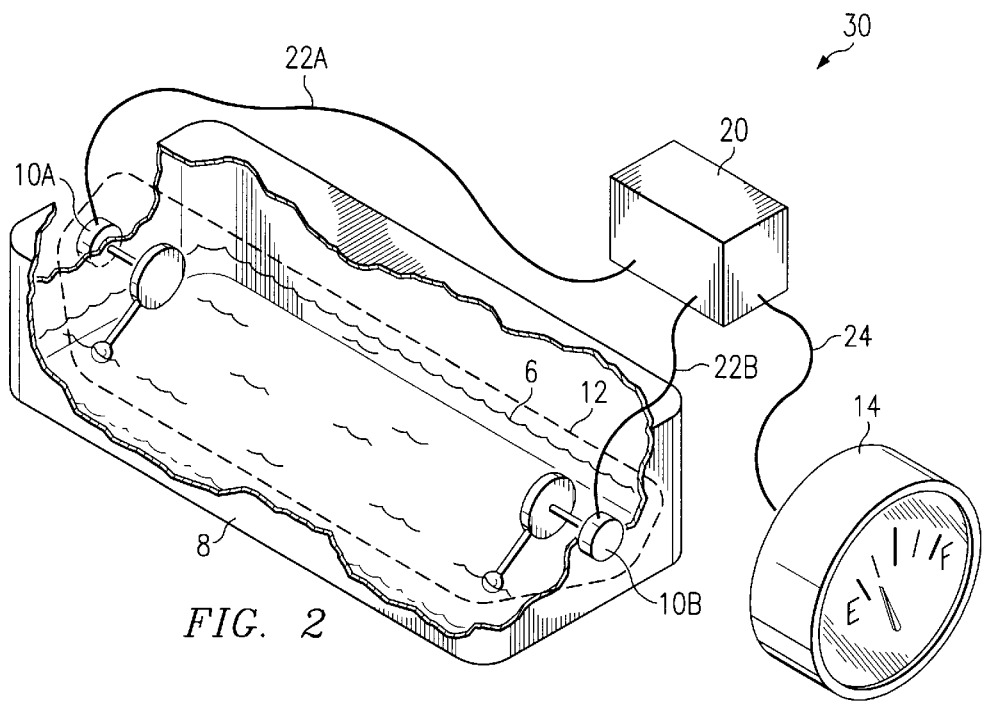
FIG. 2 depicts a liquid level measurement system, according to one embodiment of the invention.

With reference to FIG. 2, a system for liquid level measurement, according to the invention, is shown and denoted generally as 30. Tank 8 contains a quantity of liquid 6 being measured by measuring apparatus 12. As discussed below, measuring apparatus 12 may be of the Hall Effect or resistive float type. In general, measuring apparatus 12 includes first and second transducers 10A and 10B, respectively, whose inputs provide first and second inputs 22A and 22B, respectively, to the computer 20. Accordingly, first and second inputs 22A, 22B carry first and second liquid level measurement signals to computer 20 which, according to the invention, are calibrated and summed by computer 20. Thus, computer 20 will output a calibrated fuel quantity output 24 to a readout instrument 14. Readout instrument 14 may be an analog fuel gauge such as the type of fuel gauge typically used in a car, light aircraft or other vehicle. Alternatively, readout instrument 14 can be a digital readout fuel gauge which provides a digital reading of the fuel quantity within tank 8.

Figure 3:
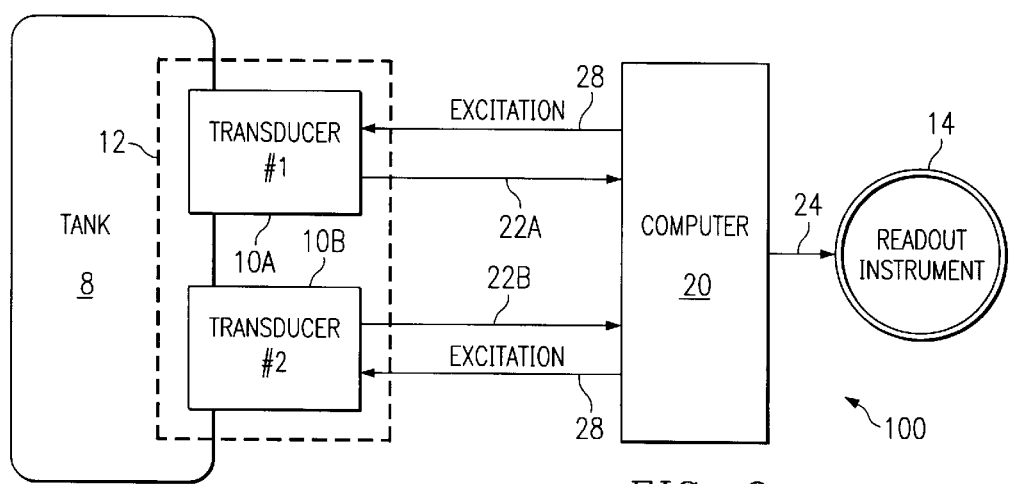
FIG. 3 is a block diagram of a liquid level measurement system, according to the invention.

With reference to FIG. 3, therein is shown a block diagram of a liquid level measurement system, 100, according to the invention. Essentially, a quantity of liquid 6 is being measured in tank 8. Tank 8 has a measuring apparatus 12 consisting of a first and second transducers 10A, 10B. Each of the transducers 10A, 10B provides respective first and second inputs 22A, 22B to computer 20. In the case where transducers 10A, 10B are of the Hall Effect transducer type, excitation signals 28A and 28B are applied to each transducer 10A, 10B. Accordingly, first and second transducers 10A, 10B then provide first and second liquid level measurement signals on inputs 22A, 22B, respectively, to computer 20.

Computer 20 then sums and calibrates the signals received on inputs 22A, 22B to deliver a calibrated fuel quantity output 24 to the readout instrument 14. For example, for a Hall Effect transducer excited with a voltage of "V" volts DC, the output voltage will be between zero and V volts with an applied magnetic field. Typically, a Hall Effect transducer gives an output voltage of approximately 0.2 volts and 0.8 volts over the full range of the float connected to the Hall Effect transducer. In a particular case, due to the design of the digital gauge, the required output is approximately 0.17 volts at empty and 0.82 volts at full.

Figure 4:
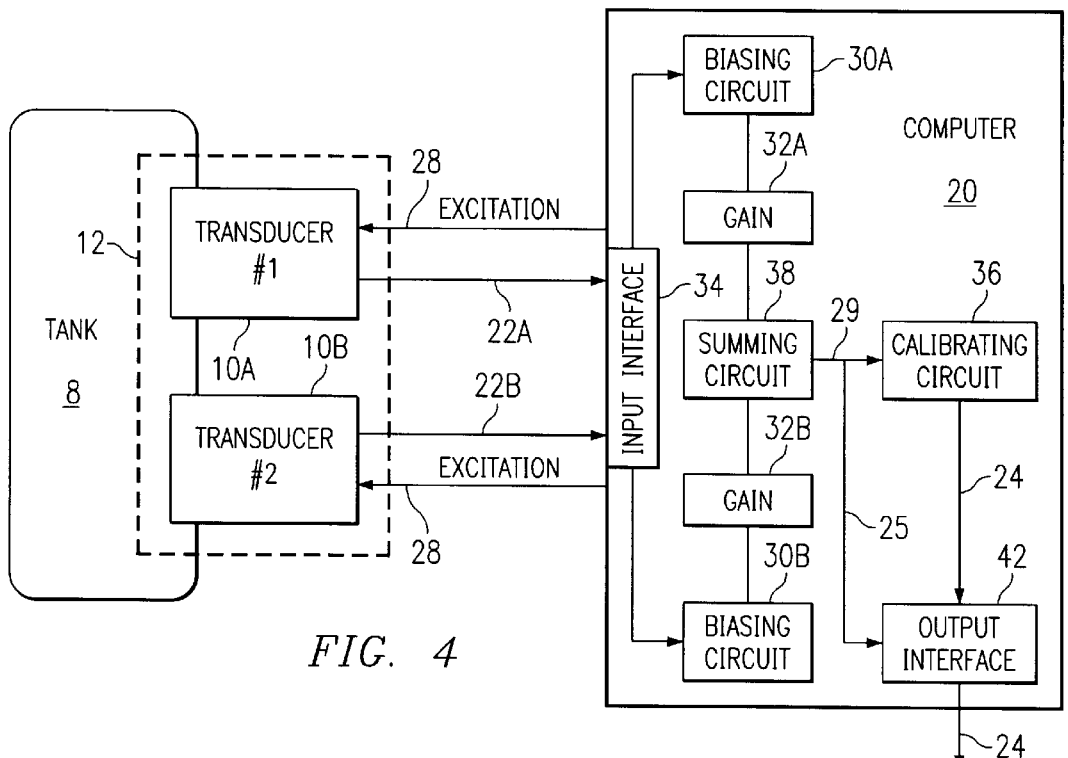
FIG. 4 is a block diagram of a computer for use in a liquid level measurement system, according to one embodiment of the invention.

In FIG. 4, a more detailed block diagram of the computer 20 used to determine the level of liquid within tank 8 is shown. First and second inputs 22A, 22B enter computer 20 through an input interface 34. A first liquid level measurement signal from first transducer 10A proceeds from the input interface 34 to a first biasing circuit 30A. The first biasing circuit 30A provides an adjustable offset bias to minimize voltage errors in the input bias current received in the first liquid level measurement signal.

After biasing, the first liquid level measurement signal received from input 22A passes to a first gain circuit 32A. Those skilled in the art recognize that a gain circuit 32A allows the signal to be balanced and matched to a desired level. The output of the gain circuit 32A provides a first input to the summing circuit 38.

Accordingly, a second liquid level measurement signal from second transducer 10B arrives at input interface 34 via a second input 22B. The second liquid level measurement signal is also adjusted by a corresponding second biasing circuit 30B and a second gain circuit 32B. Second liquid level measurement signal is then summed with the first liquid level measurement signal in summing circuit 38. Accordingly, summing circuit 38 provides a summed output 39 to calibrating circuit 36. Calibrating circuit 36 next provides a calibrated fuel quantity output signal 24 to the output interface 42. Finally, calibrated fuel quantity output signal 24 is displayed on a readout instrument 14. Alternatively, the uncalibrated fuel quantity output signal 25 is provided from the summing circuit 38 and is available from the output interface 42 to use by other readout instruments that might be in the system such as, for example a low fuel warning indicator.

Figure 5:
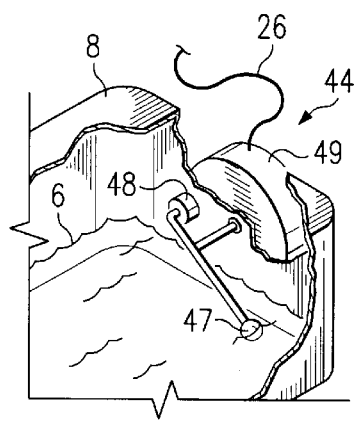
FIG. 5 illustrates the operation of a Hall Effect transducer.

FIG. 5 illustrates the operation of a Hall Effect transducer 44, which can deliver a liquid level measurement signal to the computer 20 as described above. Hall Effect transducer 44 measures the change in magnetic field when magnet 48 changes location as a result of following the motion of float 47 when the liquid level quantity 6 changes in tank 8. This configuration of a Hall Effect transducer 44 has the advantage that no electrical energy passes into the fuel tank for liquid level measurements to be made.

In the case of a Hall Effect transducer 44, for example, a regulator is used to supply bias voltage to the Hall Effect transducer 44 on each of two connector pins. Where transducers 10A, 10B are of the Hall Effect type, connections for power, transducer output and ground are made to each transducer 10A, 10B from separate pins on the computer 20.

Figure 6:
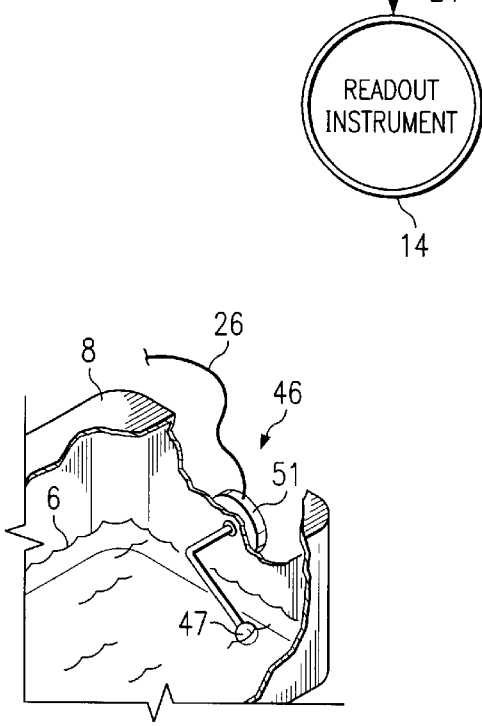
FIG. 6 illustrates the operation of a resistive float fuel transducer.

With reference to FIG. 6, the operation of a typical float resistive transducer 46 is shown. Float resistive transducer 46 measures a liquid quantity 6 by changing the resistance of variable resistor 51, which is driven by the movement of float 47 in tank 8. As the liquid quantity 6 changes, float 47 moves within tank 8. This change in float location causes the variable resistor 51 to change its resistance corresponding to the change in location of float 47. Variable resistor 51 then outputs a liquid level measurement signal 26, which can be input into computer 20.

In the case of a resistive float transducer 46, for example, there is no input for power since the float 47 moves the arm of a variable resistor 51 and the only output connection is the arm with the mounting flange on the other connection. When two transducers are summed, one transducer's flange is grounded and its arm is connected to the second transducer. Either the flange is insulated from ground or the arm with the two terminals connects to the computer 20 as the inputs 22A, 22B.

Those skilled in art will recognize and appreciate that to use the computer 20 with resistive float transducers 46, a method must be devised to derive a voltage at the output of the resistive float transducer 46. This is accomplished by adding circuits in the computer 20 which provide an output constant current of an appropriate fixed magnitude to each of the transducer power input pins. Now, with the constant current source connected to the arm of the resistive float transducer 46 and the other terminal grounded, the voltage through the variable resistor 51 is a direct function of the position of the arm. By suitably selecting the internal resistors to determine the magnitude of the current source, the range of the output voltage on the arm of the resistive float transducer 46 is selected in order to be compatible with the input signal requirements of the computer 20. Now, if the liquid level measurement signals input to computer 20 are also connected to the arm of the resistive float transducer 46, the computer 20 thinks that the resistive float transducer 46 is a Hall Effect transducer 44 and calibration is the same as for a Hall Effect device.

Computer 20 may be used with Hall Effect transducer 44 by removing components that form the constant current sources, two fixed resistors and two PNP transistors, and replacing these components with four jumper wires. This requires no changes in the aircraft wiring since all that is required is an adaptor cable for each transducer. For example, if for inventory commonality, it is a requirement to allow no changes to the computer 20, a cable adaptor may be inserted into the computer output interface 42 to change the sources of power from the current sources on each of the two pins to the required voltage sources on each of two different pins.

Figure 7:
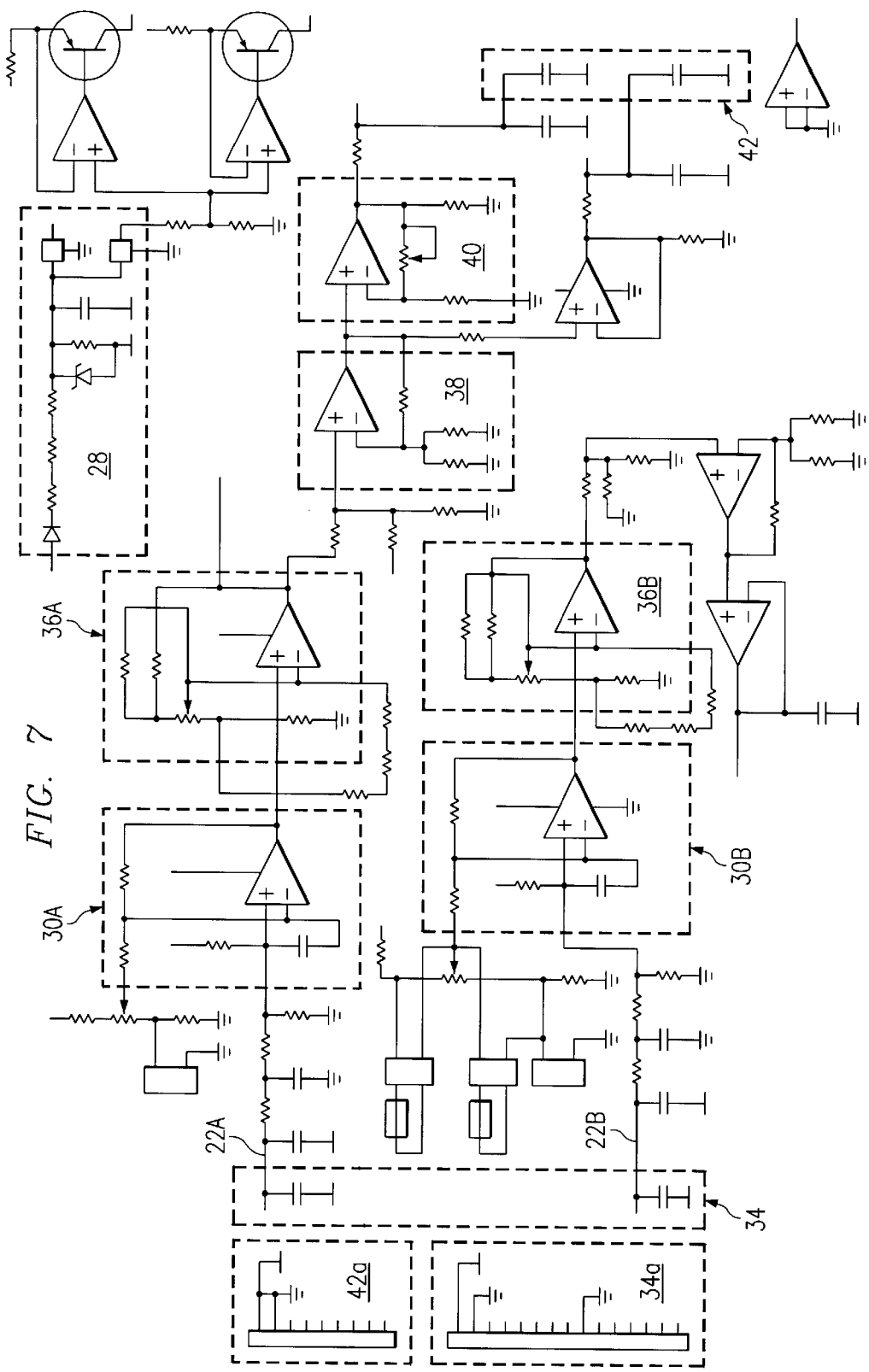
FIG. 7 is a circuit schematic of a computer suitable for use in a system for liquid level measurement, according to the invention.

FIG. 7 is a circuit schematic of a computer 20 useful in a liquid level measurement system, according to the invention. The first and second transducers 10A, 10B provide a first and second input 22A and 22B into the input interface 34. The signal of first input 22A is adjusted by the first bias circuit 30A followed by a gain adjustment in the first gain circuit 36A. After the input signal 22A has been adjusted for bias and gain, it arrives in the summing circuit 38.

Accordingly, the second liquid level measurement signal from transducer 10B arrives through the second input 22B coupled to the input interface 34. A pin out diagram for the output interface 34 is represented by 34A. The second input 22B is then adjusted for bias by the second biasing circuit 30B and then adjusted for gain by the second gain circuit 36B. Next, the second input 22B is joined with the first liquid level measurement signal 22A in summing circuit 38. The summed output 39 is then provided to the calibrating circuit 40 where the signal is calibrated and provided to the output interface 42 to be used in a readout instrument 14. Additionally, an uncalibrated fuel quantity output signal 25 is provided from the summing circuit 38 to the output interface 42 to be used by other output devices. A pin out configuration for computer 20 is shown in 42A. Those skilled in the art can appreciate the circuit and how to implement it in a liquid level fuel measurement system.

Essentially, the input from the first and second transducers 10A, 10B in a tank 8, either left or right, is processed as a voltage and an adjustable offset bias is applied and summed in each of two conventional single-ended single-supply operational amplifiers. The output of each bias amplifier is connected to one of two similar conventional single-ended, single-supply operational amplifiers, each providing a controlled gain function. Each channel is thus able to be independently balanced and gain matched to provide equal signals to a common summing amplifier which mixes the first and second liquid level measurement signals with equal gain for each signal.

The output of the summing amplifier is sent to a conventional singleended, single supply operational amplifier configured as a voltage follower with output filtered by a low pass filter and applied to a low fuel warning output on a connector for use by a readout instrument 14 such as a systems annunciator in the airplane 2. The output of the summing amplifier is also sent to a conventional single-ended, single supply operational amplifier configured as a variable gain amplifier whose output is filtered with a low pass filter and applied to the fuel quantity output on the connector for use by the digital fuel quantity gauge in the airplane 2. The input aircraft system power, 28 Volts DC in this example, is filtered and voltage clamped to eliminate destructive transients and applied to two independent integrated circuit positive regulators, each supplying 5 Volts DC.

Figure 8:
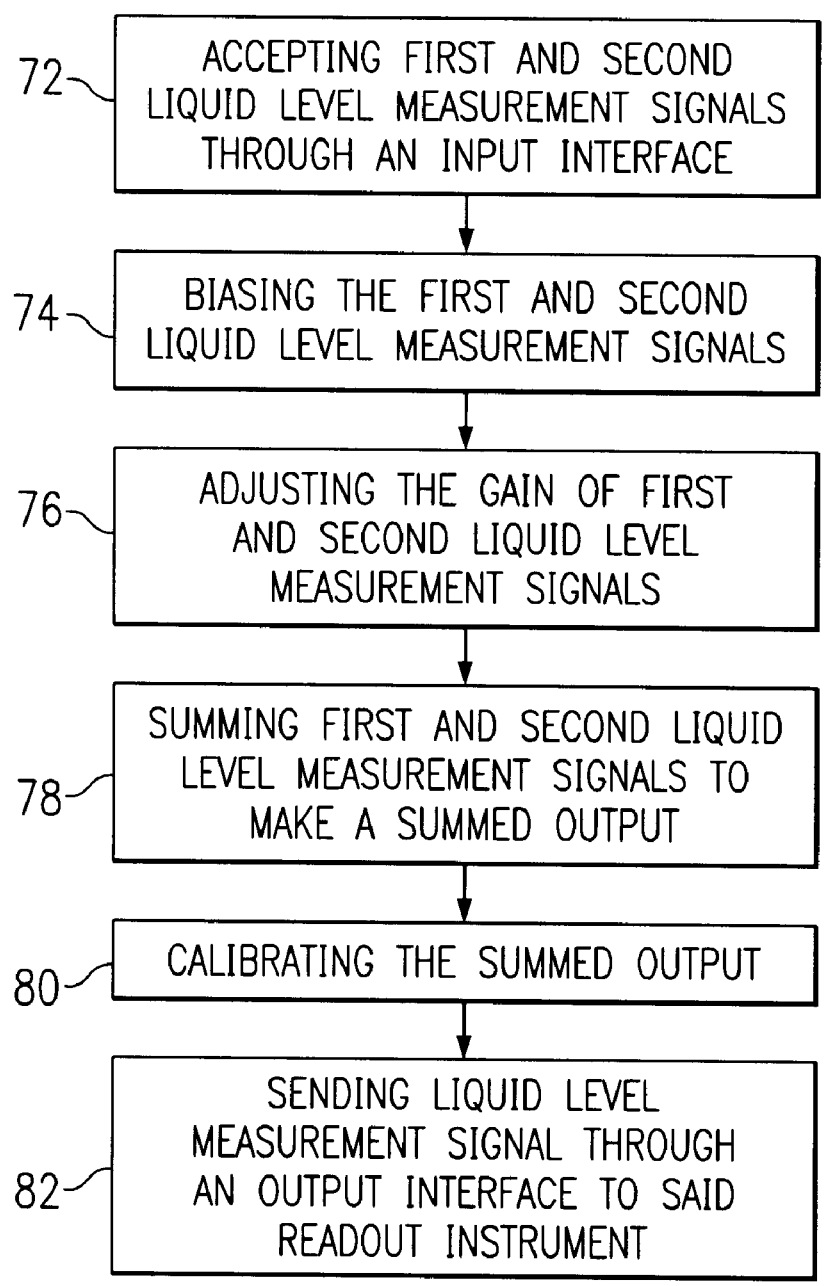
FIG. 8 is a flow diagram of a method of achieving liquid level measurement, according to the invention.

FIG. 8 is a flow diagram of a method for achieving liquid level measurement, according to the invention. The method, denoted generally as 70, involves determining the quantity of fuel in a tank 8 having a measuring apparatus 12. Measuring apparatus 12 consists of first and second transducers 10A, 10B producing corresponding first and second liquid level measurement signals, respectively, which are delivered to computer 20 which provides a calibrated output to a readout instrument 14.

At step 72, the first and second liquid level measurement signals are accepted through an input interface 34 into the computer 20. Next, at step 74, the first and second liquid level measurement signals are biased and first and second liquid level measurement signals are adjusted for gain so that they will match and balance each other at an appropriate level at step 76. At step 78, the first and second liquid level measurement signals are summed to produce a summed output 39. Next, at step 80, the summed output 39 is calibrated so that the liquid level measurement signal will match the appropriate range for a readout instrument 14. Finally, at step 82, the calibrated fuel quantity output signal 24 is delivered through an output interface 42 to a readout instrument 14. In this way, the present invention provides a liquid level measurement system that can be used with different types of measuring apparatus 12 to deliver a calibrated output to the readout instrument 14.

While this invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. A computer for receiving liquid level measurements from either Hall Effect or resistive float type transducers and delivering a calibrated fuel quantity output signal to a readout instrument within a vehicle, the computer comprising:

an input interface with a first input for accepting a first liquid level measurement signal from a first of said transducers;

a first bias circuit providing an adjustable offset bias to minimize voltage errors due to input bias current received in said first liquid level measurement signal;

a calibrating circuit wherein said first liquid level measurement signal is calibrated to provide said calibrated fuel quantity output signal that can be displayed by said readout instrument; and an output interface between said calibrating circuit and said readout instrument.

2. The computer of claim 1 wherein said input interface is further adapted to interact with a float resistive fuel transducer.

3. The computer of claim 1 wherein said input interface is further adapted to interact with a Hall Effect fuel transducer.

4. The computer of claim 1 wherein said input interface is further adapted to concurrently interact with both a resistive float fuel transducer and a Hall Effect fuel transducer.

5. The computer of claim 1 wherein said measuring apparatus includes first and second transducers and wherein said input interface further comprises first and second inputs electrically coupled to said first and second transducers, respectively, for receiving corresponding first and second liquid level measurement signals.

6. The computer of claim 5 further comprising a second bias circuit providing an adjustable offset bias to minimize voltage errors due to input bias current received in said second liquid level measurement signal.

7. The computer of claim 6 further comprising a second gain circuit to adjust said second liquid level measurement signal to balance and match said first gain circuit.

8. The computer of claim 7 further comprising a summing circuit to sum the first and second liquid level measurement signals of said first and second gain circuits, said summing circuit providing a summed output to said calibrating circuit.

9. The computer of claim 8 wherein said summed output is calibrated by said calibrating circuit to provide said calibrated fuel quantity output signal to said readout instrument.

10. The computer of claim 8 wherein said summing circuit provides an uncalibrated fuel quantity output signal to said output interface.

11. The computer of claim 1 further comprising a first gain circuit to adjust said first liquid level measurement signal.

12. A liquid level measurement system for use in a vehicle comprising:

first and second transducers of the Hall Effect or restrictive float type, said transducers adapted to determine the level of liquid in one or more tanks of said vehicle and produce first and second liquid level measurement signals;

a computer for calibrating said first and second liquid level measurement signals, said computer including an input interface to said first and second transducers for receiving said first and second liquid level measurement signals, and a calibration circuit for producing a calibrated fuel quantity output signal; and a readout instrument communicably coupled to said calibrated fuel quantity output signal of said computer for providing a readout representing a quantity of liquid in said tank.

13. The system of claim 12 wherein said measuring apparatus further comprises a float resistive fuel transducer.

14. The system of claim 12 wherein said computer further comprises:

said input interface with a first input for accepting said first liquid level measurement signal from said first transducer;

a first bias circuit providing an adjustable offset bias to minimize voltage errors due to input bias current received in said first liquid level measurement signal;

said calibrating circuit calibrating said first liquid level measurement signal to provide said calibrated fuel quantity output signal that can be displayed by said readout instrument; and an output interface adapted to filtering out unwanted noise, wherein said calibrated fuel quantity output signal is output to said readout instrument.

15. The system of claim 14 wherein said input interface further comprises a second input from said second transducer providing said second liquid level measurement signal.

16. The system of claim 15 wherein said computer further comprises a second bias circuit providing an adjustable offset bias to minimize voltage errors due to input bias current received in said second liquid level measurement signal.

17. The system of claim 16 wherein said computer further comprises a second gain circuit to adjust said second liquid level measurement signal to balance and match said first gain circuit.

18. The system of claim 17 wherein said computer further comprises a summing circuit to sum the first and second liquid level measurement signals of said first and second gain circuits, said summing circuit providing a summed output to said calibrating circuit.

19. The system of claim 18 wherein said summed output is calibrated by said calibrating circuit to provide said calibrated fuel quantity output signal to said readout instrument.

20. The system of claim 18 wherein said summing circuit provides an uncalibrated fuel quantity output signal to said output interface.

21. The system of claim 14 wherein said computer further comprises a first gain circuit to adjust said first liquid level measurement signal.

22. A method for determining a measurement of liquid level in one or more tanks of a vehicle that uses having first and second transducers producing first and second liquid level measurement signals, respectively, into a computer, said first and second transducers being of the Hall Effect or resistive float type, said computer providing an output to a readout instrument within said vehicle, the method comprising the following steps:

accepting said first and second liquid level measurement signals through an input interface;

adjusting the gain of said first and second liquid level measurement signals, summing said first and second liquid level measurement signals to make a summed output; and sending said liquid level measurement signal through an output interface to said readout instrument.

23. The method of claim 22 wherein said step of adjusting the gain is preceded by the step of biasing the first and second liquid level measurement signals.

24. The method of claim 23 wherein said step of summing said first and second liquid level measurement signals is followed by the step of calibrating the summed output.

* * * * *